(12) United States Patent
Fowlkes

(10) Patent No.: US 6,554,370 B2
(45) Date of Patent: Apr. 29, 2003

(54) WHEEL SPINNER ASSEMBLY INDEPENDENTLY ROTATABLE RELATIVE TO A CORRESPONDING WHEEL

(76) Inventor: David Fowlkes, 33 N. Devon Park Ct., Devon, PA (US) 19333

( * ) Notice: Subject to any disclaimer, the term of this patent is extended or adjusted under 35 U.S.C. 154(b) by 0 days.

(21) Appl. No.: 09/923,918

(22) Filed: Aug. 7, 2001

(65) Prior Publication Data

US 2002/0036426 A1 Mar. 28, 2002

Related U.S. Application Data

(60) Provisional application No. 60/224,501, filed on Aug. 11, 2000.

(51) Int. Cl.[7] .............. B60B 7/04; B60B 7/00
(52) U.S. Cl. .............. 301/37.25; 301/37.101; 301/37.108
(58) Field of Search .............. 301/37.25, 37.101, 301/37.26, 37.28, 37.29, 37.106, 37.108, 37.109, 37.38, 37.372, 37.376, 108.1, 108.4, 108.5

(56) References Cited

U.S. PATENT DOCUMENTS

| | | |
|---|---|---|
| 1,432,274 A | 10/1922 | Braucher |
| 2,130,220 A | 9/1938 | Ball et al. .............. 40/129 |
| 2,548,070 A | 4/1951 | Ryan .............. 40/129 |
| 2,727,790 A | 12/1955 | Gaylord |
| 2,762,469 A | 9/1956 | Lyon .............. 188/264 |
| 2,869,262 A | 1/1959 | Lucas .............. 40/129 |
| 2,935,361 A | 5/1960 | Aske .............. 301/37 |
| 2,997,344 A | 8/1961 | Whiteman .............. 301/37 |
| 3,158,946 A | 12/1964 | Upchurch .............. 40/129 |
| 3,219,391 A | 11/1965 | Hettinger .............. 301/37 |
| 3,457,663 A | 7/1969 | Beaudoin et al. |
| 3,495,347 A | 2/1970 | Sims .............. 40/129 |
| 3,722,958 A | 3/1973 | Marshall .............. 301/37 |
| 3,810,679 A | 5/1974 | Myers .............. 301/108 |
| D303,103 S | 8/1989 | Brouch et al. .............. D12/207 |
| 5,016,944 A | 5/1991 | Schultz .............. 301/37 |
| 5,190,354 A | 3/1993 | Levy et al. .............. 301/37.25 |
| 5,286,092 A * | 2/1994 | Maxwell, Jr. .............. 301/37.26 |
| 5,290,094 A | 3/1994 | Gragg .............. 301/37.05 |
| 5,490,342 A | 2/1996 | Rutterman et al. .............. 40/587 |
| 5,584,537 A | 12/1996 | Miansian .............. 301/35.63 |
| 5,588,715 A | 12/1996 | Harlen .............. 301/37.25 |
| 5,659,989 A | 8/1997 | Hsiao et al. .............. 40/587 |
| 5,957,542 A | 9/1999 | Boothe et al. .............. 301/37.25 |
| 6,045,195 A | 4/2000 | Okamoto .............. 301/37.1 |
| D424,502 S | 5/2000 | Noriega .............. D12/213 |
| 6,120,104 A | 9/2000 | Okamoto et al. .............. 301/37.25 |

* cited by examiner

Primary Examiner—S. Joseph Morano
Assistant Examiner—Jason R. Bellinger
(74) Attorney, Agent, or Firm—Holland & Knight LLP

(57) ABSTRACT

A wheel spinner assembly mountable onto a corresponding wheel of a vehicle is provided. The assembly includes a wheel mount supportable by the wheel. A spinner mount is connected to the wheel mount. A bearing assembly is supported by the spinner mount. A spinner is supported by the bearing assembly, wherein the bearing assembly allows the spinner to rotate independently relative to the corresponding wheel as the vehicle is in motion.

12 Claims, 4 Drawing Sheets

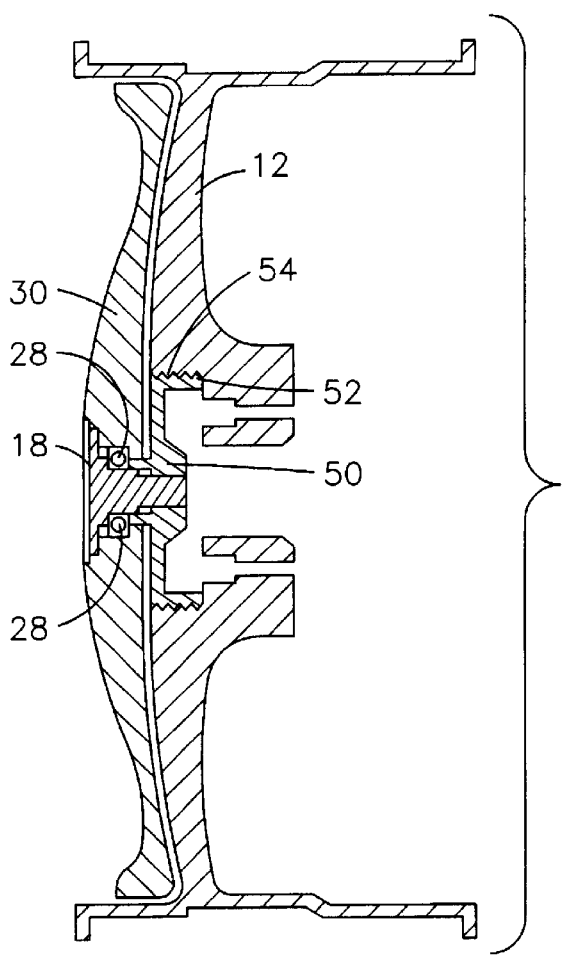
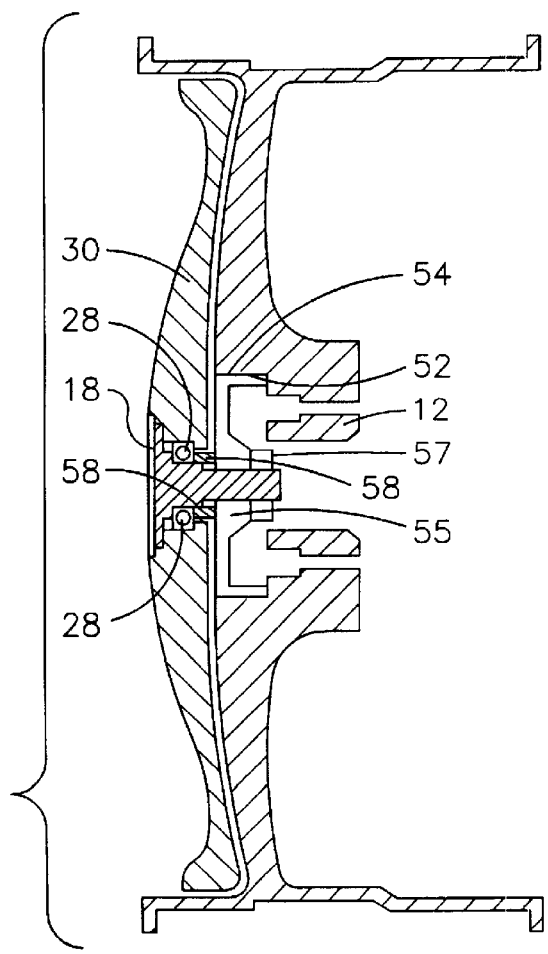
FIG. 4
FIG. 5

WHEEL SPINNER ASSEMBLY INDEPENDENTLY ROTATABLE RELATIVE TO A CORRESPONDING WHEEL

RELATED APPLICATION DATA

This application claims benefit of co-pending provisional patent application No. 60/224,501 entitled "Wheel Spinner Independently Rotatable Relative to a Corresponding Wheel" filed Aug. 11, 2000. The contents of that application are incorporated herein by reference.

BACKGROUND OF THE INVENTION

The present invention is generally related to wheel spinners and, more particularly, to a wheel spinner assembly that allows independent rotation of a wheel spinner relative to wheel rotational speed.

Vehicle wheels held in place by decorative nuts, sometimes referred to as spinner nuts, are a well-known and familiar sight on vehicles and also in racing and competition vehicles. Further, a number of sports cars, imported and domestic, have been provided with wire wheels or light-alloy wheels which are mounted on the vehicle by such decorative nuts. In known wheel assemblies, the wheel and decorative nut have a direct mechanical coupling to one another and consequently the decorative nut rotates at the same rotational speed as the wheel, e.g., same revolutions per minute, (RPM). Thus, as the vehicle moves, the wheel and the decorative nut may be perceived by observers outside the vehicle as a rather pleasant blur.

Other known wheel assemblies have used bearing means to fully decouple wheel rotation from a stationary wheel cover, such as may be desirable when that cover carries advertisement displays or other information that, in order to be legible to an observer, needs to be stationary when the vehicle is in motion. Thus, the foregoing known wheel assemblies are designed either to rotate at full wheel speed, or, conversely, to fully suppress rotation as the wheel rotates. However, it is believed that no technique has been provided that takes advantage of aesthetically pleasant visual effects that may occur if the spinner were to rotate at a different speed relative to the wheel speed.

In view of the foregoing, it would be desirable to provide a wheel spinner that rotates at a different rotational speed than the speed of the wheel so as to provide an aesthetically pleasing view to the observer. For example, if the rotational speed of the wheel spinner is less relative to the rotational speed of the wheel (or some multiple of it), then this may result in giving the illusion to the observer that the vehicle is "hovering", as the wheel/wheel spinner combination gives the appearance of standing still to that observer. Further, visually pleasant effects may be achieved if the spinner continues to spin for an extended period of time after the vehicle comes to a stop.

SUMMARY OF THE INVENTION

Generally, the present invention fulfills the foregoing needs by providing in one aspect thereof, a wheel spinner assembly mountable onto a corresponding wheel of a vehicle. The assembly includes a wheel mount supportable by the wheel. A spinner mount is connected to the wheel mount. A bearing assembly is supported by the spinner mount. A spinner is supported by the bearing assembly, wherein the bearing assembly allows the spinner to rotate independently relative to the corresponding wheel as the vehicle is in motion.

The present invention further fulfills the foregoing needs by providing in another aspect thereof, a wheel spinner assembly to be mounted onto a corresponding wheel of a vehicle. The wheel spinner assembly includes a spinner and a bearing assembly configured to provide independent rotational motion between the spinner and the wheel as the vehicle is in motion, and wherein the angular moment of inertia of the spinner is chosen to facilitate continued rotation of the spinner as the vehicle comes to a stop.

In yet another aspect of the present invention, the wheel spinner assembly includes a spinner, and a bearing assembly configured to provide independent rotational motion between the spinner and the wheel, and wherein the spinner is rotatable at a speed lesser than that of the wheel speed. The lesser speed generally results in an observer perceiving no apparent, or slower, rotational motion of the wheel as the vehicle is in motion.

DESCRIPTION OF THE DRAWINGS

FIG. 4 is a cross sectional view of an alternative embodiment of the wheel spinner of the present invention.

FIG. 5 is a cross sectional view of an alternative embodiment of the wheel spinner of the present invention.

Figure 1:
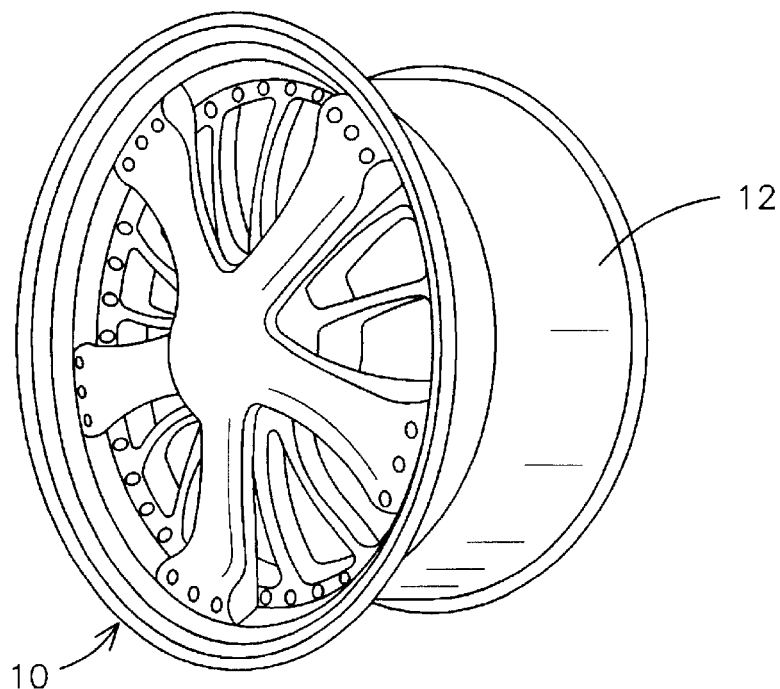
FIG. 1 illustrates an isometric view of an exemplary wheel spinner assembly in accordance with one aspect of the present invention, and wherein the wheel spinner assembly is illustrated in combination with a wheel of a vehicle.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

FIG. 1 illustrates an exemplary spinner assembly 10 in accordance with one aspect of the present invention. Spinner assembly 10 is mountable, as described in further detail below, onto a corresponding wheel 12 of a vehicle. It will be appreciated that the present invention is not limited to self-propelled vehicles since hauling transportation equipment, such as semitrailers, boat-carrying trailers, etc., may equally benefit from the wheel spinner embodying the present invention.

Figure 2:
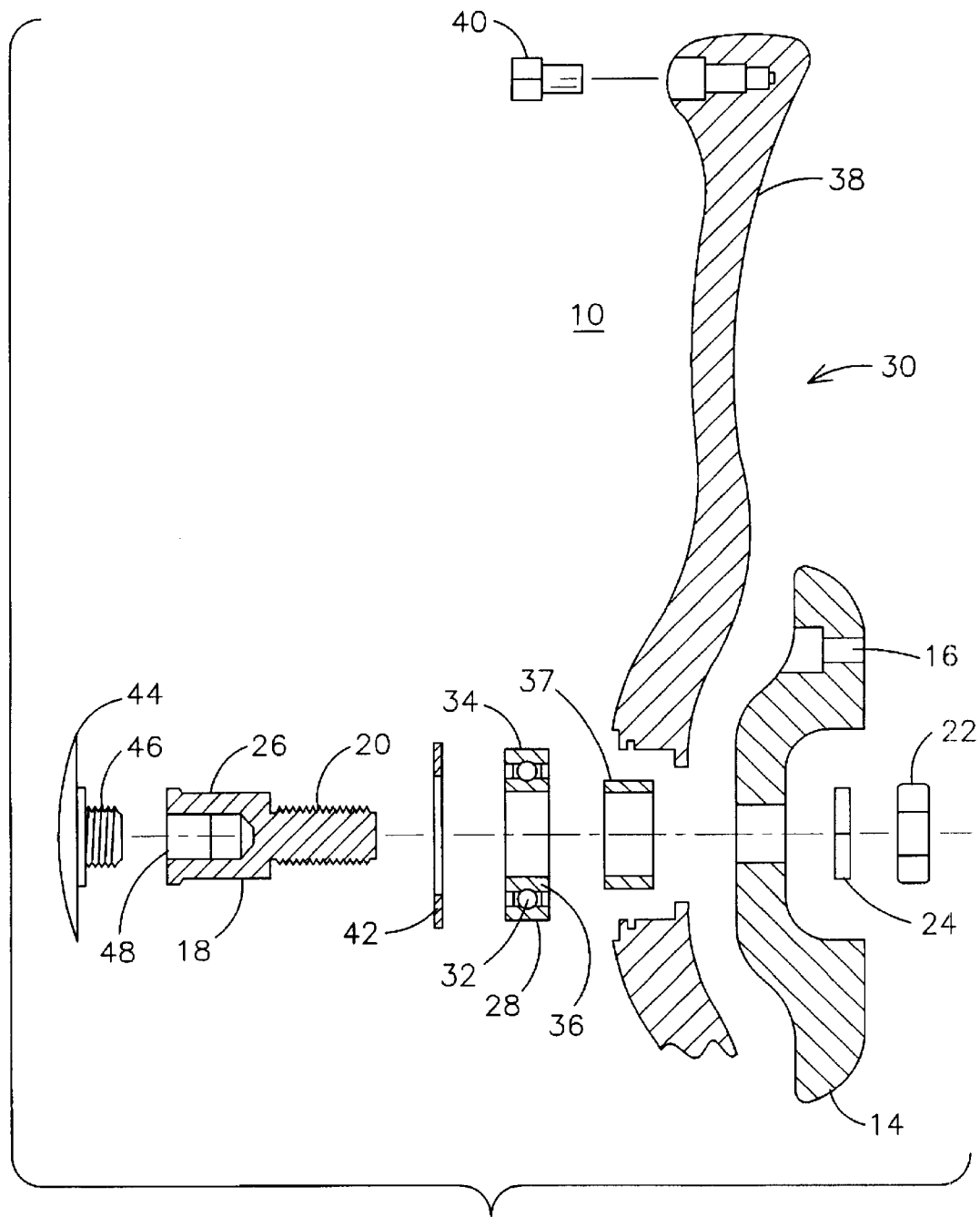
FIG. 2 illustrates an exploded view of the wheel spinner assembly of FIG. 1.

As shown in FIG. 2, spinner assembly 10 comprises a wheel mount 14 directly affixed to a respective wheel of the vehicle, e.g., wheel 12 (FIG. 1), by suitable fastening means, such as a plurality of bolts 15 (FIG. 3) which respectively extend through a plurality of corresponding bolt passageways in wheel mount 14, e.g., passageway 16, to be received by corresponding openings (not shown) constructed in the wheel of the vehicle. In one exemplary embodiment, bolts 15 are distinct from any bolts that may be commonly used for affixing the wheel to the vehicle.

A spinner mount, or spindle, 18 is fixedly connected to wheel mount 14 by suitable connecting means, such as a threaded section 20 of spinner mount 18, configured to receive a corresponding nut 22 and washer 24. The spinner mount further includes a section 26 configured to receive a bearing or bushing assembly 28 that permits independent rotational motion between the spinner mount 18 and a spinner 30. That is, bearing assembly 28 allows spinner 30 to rotate at a different speed relative to the wheel speed.

By way of example, bearing assembly 28 may comprise a ball bearing assembly including a plurality of balls 32 confined between outer and inner rings 34 and 36 respectively. A bearing collar 37 may be provided to provide radial support to the inner ring of the bearing assembly. In one exemplary embodiment, bearing assembly 28 is press fitted onto the spinner mount 18. A retainer ring 42 may be used to provide axial support to bearing assembly 28. It will be appreciated that other types of bearings assemblies may be utilized to provide a desired degree of rotational motion between the spinner mount 18 and spinner 30, depending on various factors, such as vehicle wheel cruising speed, degree of surface irregularities on roads traveled by the vehicle, typical environmental conditions where the vehicle will be operated, etc.

Figure 3:
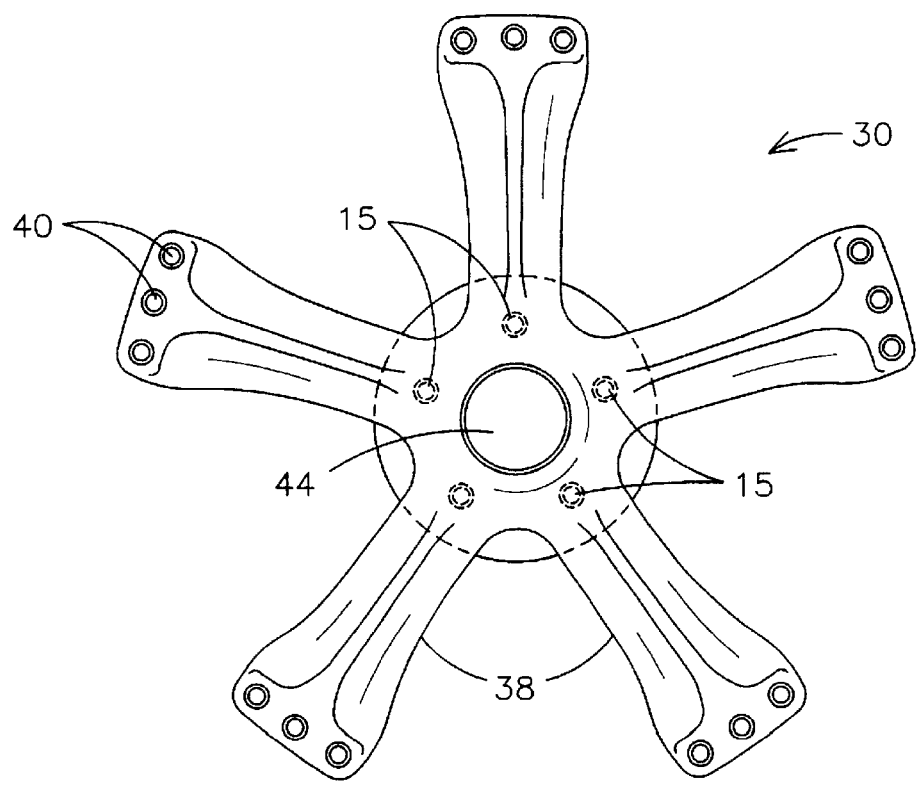
FIG. 3 illustrates an elevational front view of the wheel spinner assembly of FIG. 1.

As better seen in FIG. 3, spinner 30 comprises a plurality of radially extending spokes 38 supported by the bearing assembly 28. In one exemplary embodiment, the geometric design of the spinner 30 may be configured so that the mass of the spinner 30 is principally distributed about the outer tip or distal end of the spokes so as to have a larger angular moment of inertia relative to a spinner configuration whose mass is more closely distributed relative to the center of the spinner. In another exemplary embodiment, the angular moment of inertia of the spinner may be increased by placing weights, such as one or more screws 40, near the outer tip of the spokes. In one exemplary embodiment, the spinner 30 is made up of aluminum material. It will be appreciated that the present invention is not limited to any specific material being that any other generally corrosive-resistant, relatively light weight, high strength metal and/or alloy may be readily used for the spinner. An optional cap 44 may be received by spinner mount 18. For example, cap 44 may display a logo and include a threaded extension 46 that may be received by a corresponding receptacle 48 in spinner mount 18. Thus, when wheel 12 stops, the cap 44 also comes to a stop, thereby making any logos on the cap 44 readable.

Alternative Embodiments

With respect to FIG. 4, an embodiment is shown that illustrates how an alternative wheel mount 50 may be connected to the wheel 12. The wheel mount 50 has a threaded section 52 extending along an outer perimeter surface of the wheel mount 50. The wheel 12 has a threaded section 54 which mates with the threaded section 52 on the wheel mount 50 for securing the wheel mount 50 to the wheel 12. The spinner assembly, spinner mount 18, spinner 30 and bearing 28 are coupled to wheel 12. Specifically, spinner mount 18 is threadably received within wheel mount 50. In this regard, both spinner mount 18 and wheel mount 50 are provided with mating threaded portions. Additionally, a bearing assembly is employed in rotatably interconnecting spinner 30 and spinner mount 18. This embodiment reduces the number of parts required to install the spinner assembly by eliminating the need for a plurality of bolts 15 for mounting the wheel mount 50 to the wheel 12.

Assembly parts can further by reduced as shown in FIG. 5. FIG. 5 illustrates yet another alternative embodiment. This embodiment employs an alternative wheel mount 55. Similar to the embodiment shown in FIG. 4, the wheel mount 55 has a threaded section 52 extending along an outer perimeter surface of the wheel mount 55. The wheel has a threaded section 54 for mating relationship with the threaded section 52 on the wheel mount 55 for securing the wheel mount 55 on the wheel 12. In addition the wheel mount 55 has two spacers 58 integrally formed thereon. These spacer properly orient wheel mount 55 with respect to wheel 12 and bearing 28. Wheel mount 55 is not internally threaded. As such, a nut 57 is threaded onto the end of spinner mount 18, to thereby lock the wheel mount 55 to spinner mount 18.

Figure 6:
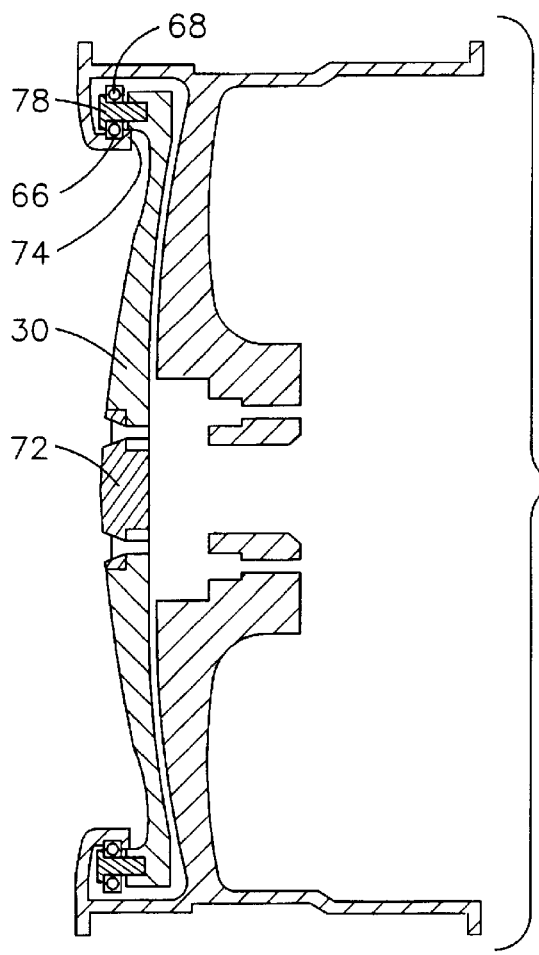
FIG. 6 is a cross sectional view of an alternative embodiment of the wheel spinner of the present invention.

With respect to FIG. 6, wheel 12 is adapted with a track 66. The track 66 guides radial bearings 68 that are connected to the ends of the spokes of spinner 30. The spinner 30 includes a plurality of spokes extending radially from a spinner center 72. The spinner center 72 is mounted to a first end of the spinner arms by fasteners. For example, bolts can be used to fasten the spinner center 72 to the spinner arms, each of which has corresponding threaded holes for receiving the bolts. The wheel 12 includes an upwardly disposed lip 74 adjacent a second end of the spokes distal the spinner center 72. A track 66 extends circumferentially along the lip 74. A bearing assembly 68 is connected to the distal end of each spoke, and fits within the track 66. The bearing assembly 68 is connected to the spoke by a fastener 78 that permits rotational motion on the fastener 78 within the track 66. For example a bolt having a threaded section secures the bearing assembly 68 on the spoke, while permitting rotational motion thereon. In this manner, when the wheel 12 rotates, the bearing assemblies 68 rotate on the bolt and travel within the track 66 facilitating rotation of the spinner assembly independent of the wheel 12.

Figure 7:
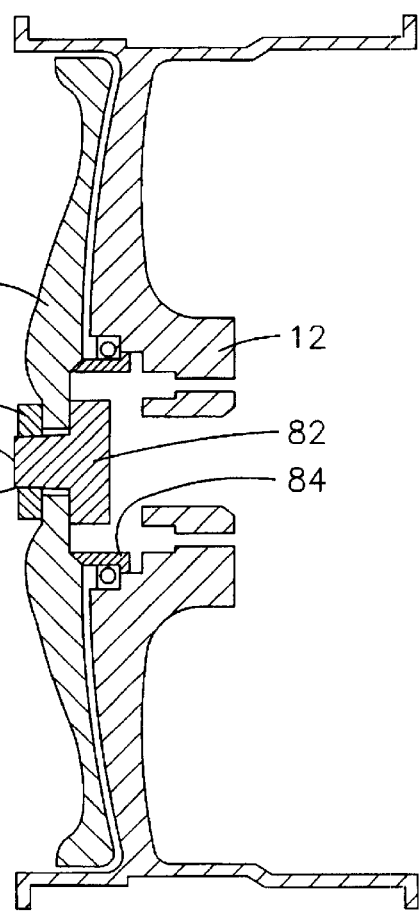
FIG. 7 is a cross sectional view of an alternative embodiment of the wheel spinner of the present invention.

FIG. 7 illustrates yet another embodiment of the present invention. This embodiment utilizes an alternative wheel mount construction 82. This wheel mount 82 includes an integral spindle 84. A bearing assembly is provided intermediate the wheel mount 82 and wheel 12. The bearing assembly permits the entire wheel mount 82 to rotate independently of the wheel 12. The wheel mount 82 further includes a threaded hub 86 to which the spinner 30 is connected. A spinner retainer nut 88 is adapted to be secured to the hub 86 and to positively secure the spinner 30, preventing it from rotating relative to the wheel mount 82. This retainer nut 88 includes an outer surface 92 which can carry indicia or logos. As can be appreciated, this embodiment allows the spinner 30 to be easily replaced with other designs or styles. That is, replacing the spinner 30 merely involves removing the threaded retaining nut 88.

The operation of each of the embodiments of the present invention is next described. In operation, due to centrifugal force, residual friction in the bearing assembly or both, the spinner can rotate independently relative to the rotation of the wheel. For example, the spinner may rotate at a slower RPM relative to the wheel speed. By way of example and not of limitation, the spinner rotation may range from about 10% to about 90% of the wheel rotation. When the vehicle comes to a full stop, the spinner may continue to revolve while gradually decreasing its RPM until coming to a full stop. When the vehicle starts to move forward, the spinner will gradually increase its RPM until a maximum spinner RPM is reached. As suggested above, in one exemplary embodiment the maximum spinner speed may be chosen relative to the wheel speed to give the illusion to the observer that the wheel/wheel spinner is standing still and that the vehicle is hovering.

It will be understood that the specific embodiment of the invention shown and described herein is exemplary only.

Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A wheel spinner assembly mountable onto a corresponding wheel of a vehicle, the assembly comprising:
   a wheel mount supportable by the wheel;
   a spinner mount connected to the wheel mount;
   a bearing assembly supported by the spinner mount;
   a spinner supported by the bearing assembly, the spinner including a number of radially extending spokes, with each spoke having a distal end with apertures located therein, wherein the bearing assembly allows said spinner to rotate independently relative to the corresponding wheel as the vehicle is in motion;
   a plurality of removable weights being positioned within the apertures of the radially extending spokes, the weights functioning to increase the angular moment of inertia of the spinner.

2. The wheel spinner assembly of claim 1 wherein an angular moment of inertia of the spinner is chosen to facilitate continued rotation of the spinner as the vehicle comes to a stop.

3. The wheel spinner assembly of claim 1 wherein the spinner is rotatable at a speed lesser than that of the wheel speed, said lesser speed generally resulting in an observer perceiving no apparent rotational motion of the wheel as the vehicle is in motion.

4. The wheel spinner assembly of claim 1 wherein each spoke is configured to have relatively more mass near a distal end thereof to increase the angular moment of inertia of the spinner.

5. A wheel spinner assembly to be mounted onto a corresponding wheel of a vehicle, the assembly comprising:
   a spinner mount removably connected to the wheel, the spinner mount having a first end with a receptacle therein;
   a spinner; and
   a bearing assembly, coupled to the spinner mount and supporting the spinner, configured to provide independent rotational motion between the spinner and the spinner mount as the vehicle is in motion;
   a cap with indicia thereon removably positioned within the receptacle of the spinner mount, the cap rotating with the spinner mount and wheel.

6. The wheel spinner assembly of claim 5 wherein an angular moment of inertia of the spinner is chosen to facilitate continued rotation of the spinner as the vehicle comes to a stop.

7. The wheel spinner assembly of claim 5 wherein the spinner is rotatable at a speed lesser than that of the wheel speed, said lesser speed generally resulting in an observer perceiving no apparent rotational motion of the wheel as the vehicle is in motion.

8. The wheel spinner assembly of claim 5 wherein the spinner comprises a plurality of spokes radially extending from the bearing assembly to a distal end.

9. The wheel spinner assembly of claim 8 wherein each spoke is configured to have relatively more mass near a distal end thereof to increase the angular moment of inertia of the spinner.

10. The wheel spinner assembly of claim 8 wherein each spoke is configured to receive a respective weight near its distal end to increase the angular moment of inertia of the spinner.

11. A wheel spinner assembly to be interconnected with a corresponding wheel on a vehicle, the assembly comprising:
    a wheel mount directly affixed to the wheel by way of a series of bolts, wherein the bolts are distinct from the bolts which are used for affixing the wheel to the vehicle;
    a spinner; and
    a bearing assembly, interconnected to the wheel mount and supporting said spinner, configured to provide independent rotational motion between the spinner and the wheel, and wherein the spinner is rotatable at a speed lesser than that of the wheel speed, said lesser speed generally resulting in an observer perceiving no apparent rotational motion of the wheel as the vehicle is in motion.

12. A wheel spinner assembly for use upon a vehicle comprising:
    a wheel mount having a central aperture and a series of mounting passageways within its periphery;
    a wheel secured to the vehicle and having a series of wheel apertures formed therein;
    a series of bolts directly affixing the wheel mount to the wheel by way of the mounting passageways and wheel apertures, the number and positioning of the bolts being equal to the number and positioning of the mounting passageways;
    a spinner mount connected to the wheel mount;
    a bearing assembly supported by the spinner mount, the bearing assembly configured to provide free rotational motion between the spinner mount and a spinner that includes a plurality of spokes configured so that said spinner rotates at a speed lesser than that of the wheel speed, said speed generally resulting in an observer perceiving no apparent rotational motion of the wheel as the vehicle is in motion, said spokes further configured to facilitate continued rotation of the spinner as the vehicle comes to a stop.

* * * * *